No. 880,713. PATENTED MAR. 3, 1908.
J. R. BLAIR.
CAN WASHING MACHINE.
APPLICATION FILED DEC. 21, 1906.

4 SHEETS—SHEET 1.

Witnesses:
Jesse A. Holton
Irving U. Townsend

Inventor:
James R. Blair
by Emery and Booth
Attys.

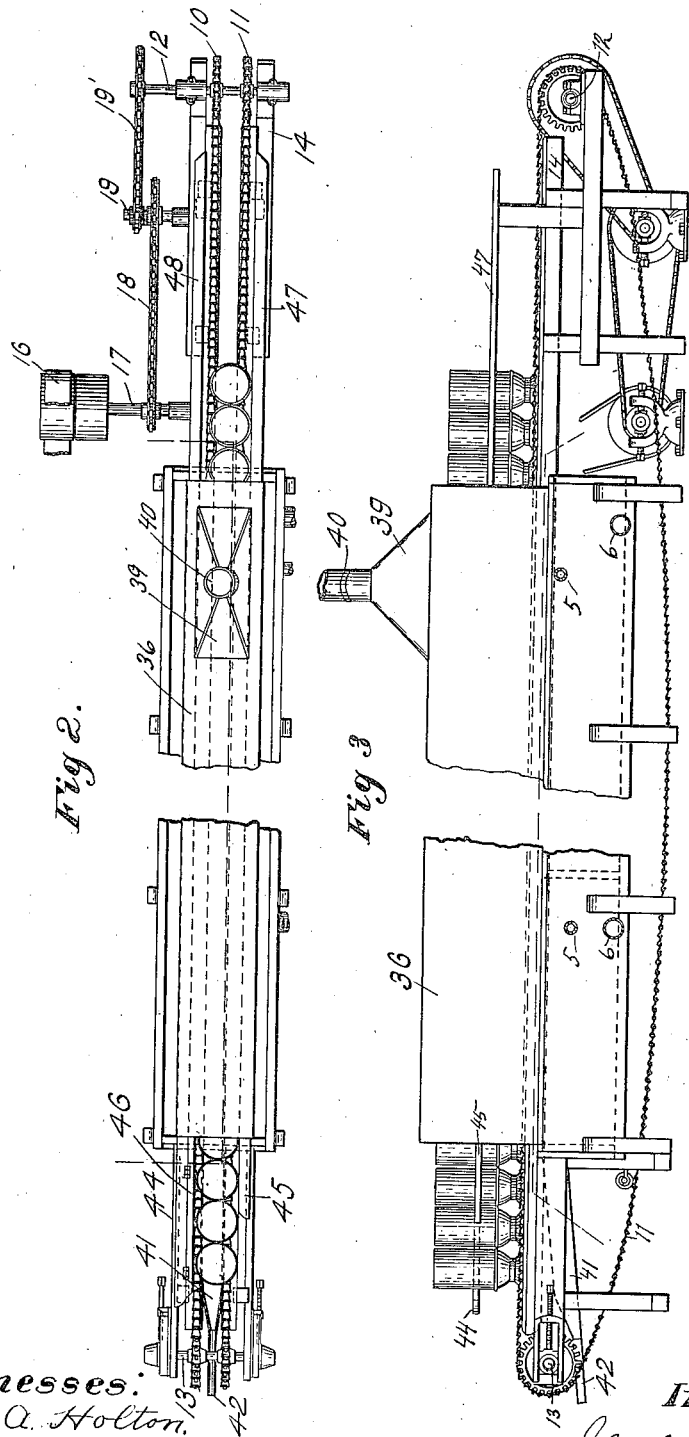

No. 880,713. PATENTED MAR. 3, 1908.
J. R. BLAIR.
CAN WASHING MACHINE.
APPLICATION FILED DEC. 21, 1906.

4 SHEETS—SHEET 3.

Witnesses
Jesse A. Holton.
Irving U. Townsend

Inventor:
James R. Blair
by Emery and Booth
Attys.

No. 880,713. PATENTED MAR. 3, 1908.
J. R. BLAIR.
CAN WASHING MACHINE.
APPLICATION FILED DEC. 21, 1906.
4 SHEETS—SHEET 4
*Fig 7a*
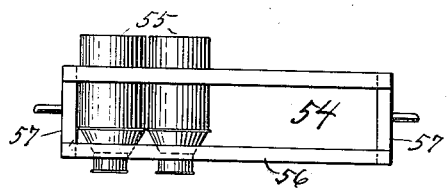
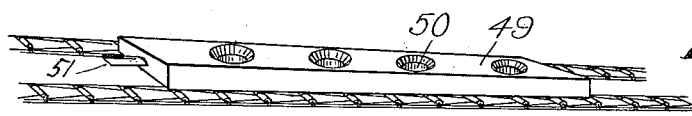
*Fig 6.*
*Fig 8.*
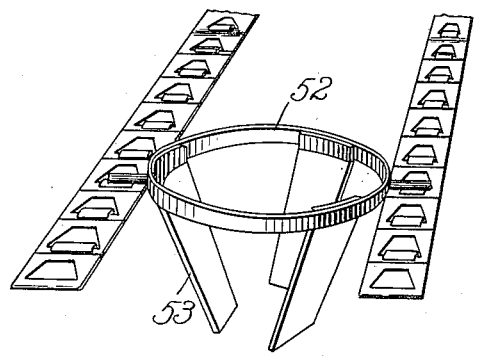
*Fig 7.*
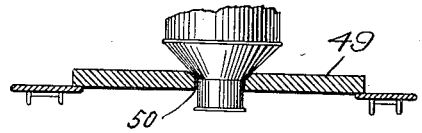
Witnesses
Jesse A. Holton
Irving U. Townsend
Inventor:
James R. Blair,
by Emery and Booth.
Attys.

UNITED STATES PATENT OFFICE.

JAMES R. BLAIR, OF BOSTON, MASSACHUSETTS.

CAN-WASHING MACHINE.

No. 880,713.  Specification of Letters Patent.  Patented March 3, 1908.

Application filed December 21, 1906. Serial No. 348,892.

*To all whom it may concern:*

Be it known that I, JAMES R. BLAIR, a citizen of the United States, residing at Boston, in the county of Suffolk, State of Massachusetts, have invented an Improvement in Can-Washing Machines, of which the following description, in connection with the accompanying drawings, is a specification, like letters on the drawings representing like parts.

This invention relates to apparatus for washing milk and other cans, pails and receptacles of various types, whereby such receptacles may be rapidly and thoroughly cleansed and preferably sterilized, in a simple and expedient manner.

Figure 1:
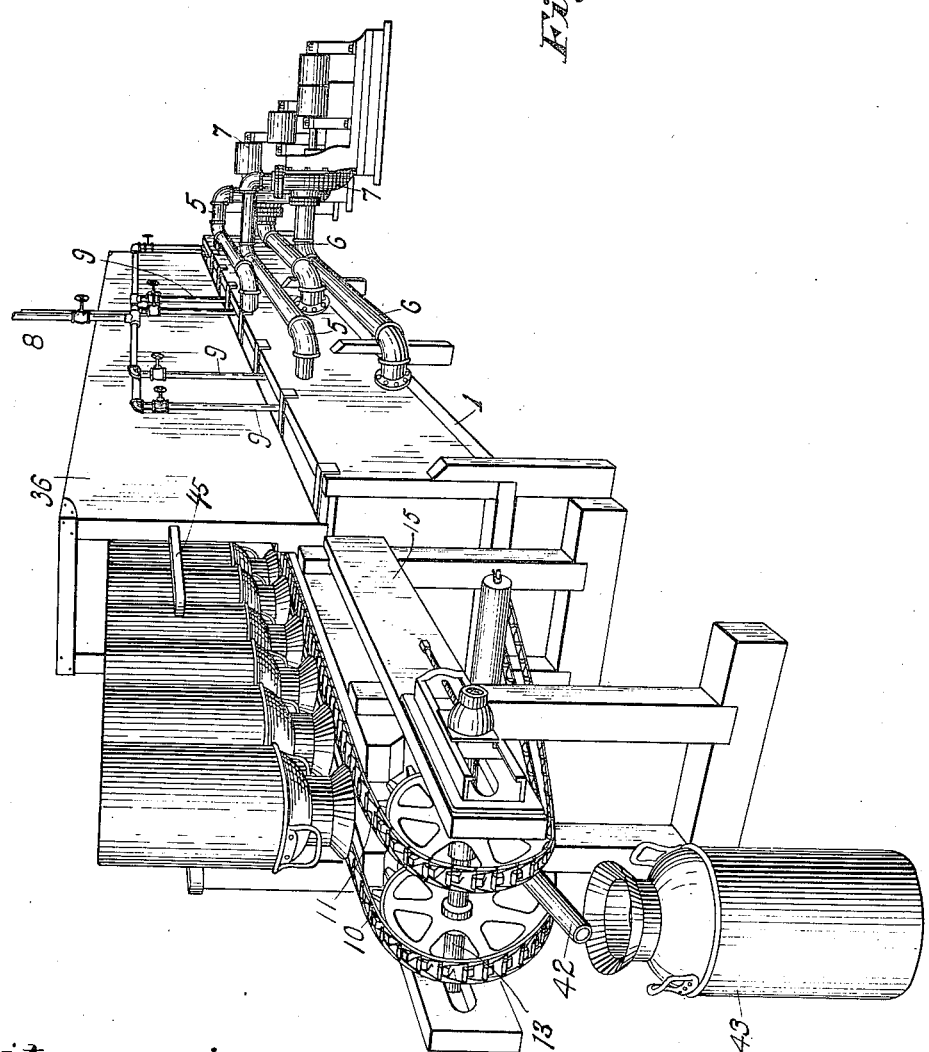
Figure 4:
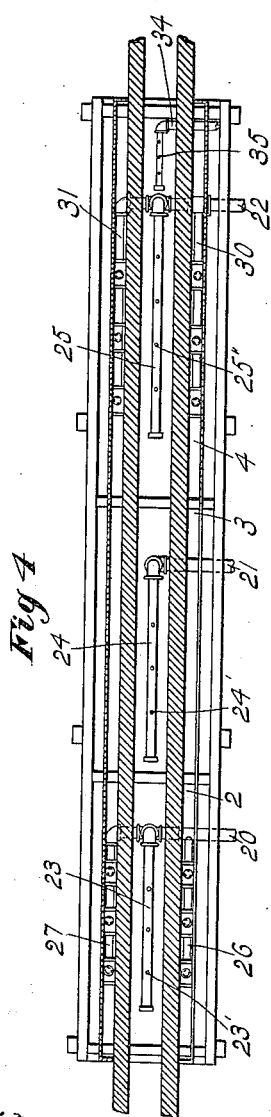
Figure 5:
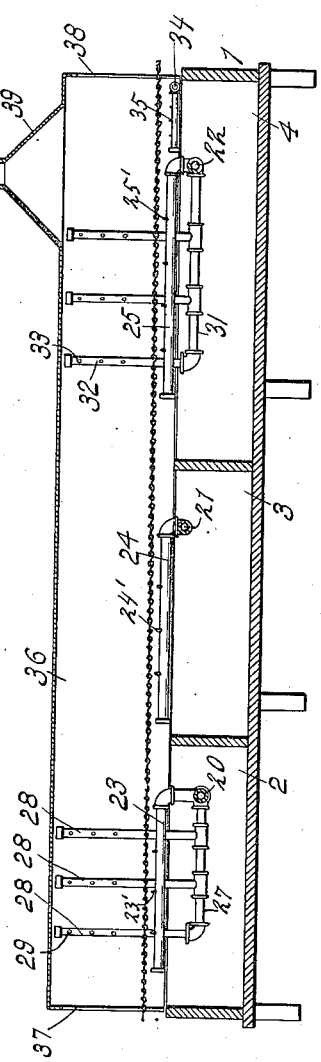

In order that the principles of the invention may be clearly set forth, I have disclosed one type or embodiment thereof in the accompanying drawings, wherein Figure 1 is the perspective view of one form of apparatus herein shown as used for washing milk cans but of general application; Fig. 2 is a plan view of the washing apparatus shown in Fig. 1, the water circulating pipes and pumps being omitted; Fig. 3 is a side elevation of the structure shown in Fig. 2; Fig. 4 is a longitudinal horizontal section of the middle portion of the apparatus shown in Fig. 2, the can conveying mechanism being omitted to illustrate parts beneath the same; Fig. 5 is a vertical central section of the middle portion of the apparatus shown in Fig. 2; Fig. 6 is a perspective view of a modified form of can or receptacle support positioned for use and that may be employed in the practice of my invention. Fig. 7 is a vertical transverse section of the support shown in Fig. 6; Fig. 7ª is a side elevation of another modification of a can or receptacle supporting rack that may be employed in the practice of my invention; and Fig. 8 is a perspective view of another form of can or receptacle supporting mechanism.

Having reference to the single type or embodiment of the invention herein selected for illustration and referring to Figs. 1 to 5 inclusive, the main or supporting frame of the apparatus is represented at 1, and herein comprises a vat or tank preferably divided by transverse partitions into compartments 2, 3 and 4 (Figs. 4 and 5) in each of which the desired washing medium may be placed. While I may employ any suitable washing or cleansing media, in the present type of the invention, I contemplate employing an alkali water in compartment 2, cold water in receptacle 3 and hot water in compartment 4, and to that end preferably employ (Fig. 1), a circulating system for each compartment, two such systems being here indicated, and each comprising an inlet pipe 5, a return pipe 6, and a pump 7, of any suitable type, rotary pumps being herein indicated. In this manner water may be continually withdrawn from each compartment by a pump, returned under pressure and discharged through the jet pipes to be described, with sufficient pressure thoroughly to cleanse the receptacles under treatment. Any suitable provision may be employed to heat the water in any desired receptacle and herein for that purpose is shown a steam inlet pipe 8, having branch pipes 9, leading into each receptacle and suitably controlled.

While the milk cans or other receptacles to be cleansed may be fed over the compartment or compartments of the tank or vat in any suitable manner, in the present embodiment of the invention there is indicated for that purpose a pair of laterally spaced endless chains 10 and 11, mounted at opposite ends of the run thereof for equal and simultaneous movement upon horizontally disposed shafts 12 and 13, preferably adjustably mounted so that any slack may be taken up in any suitable manner, as upon standards or uprights 14 and 15, located at opposite ends of the tank or vat 1, and alined therewith, it being apparent that if desired, the chains or receptacle conveying mechanism may be suitably mounted upon the vat. I prefer, however, to mount the chains in the manner indicated, as thereby an extended, exposed portion of the chains is presented at both the receiving and discharging ends thereof, as clearly indicated in Figs. 1 to 3 inclusive, thus permitting the more ready handling of the receptacles at said points. The chains 10 and 11 may be, as represented in Fig. 1, supported upon longitudinally extending guides if desired.

The chains 10 and 11 may be driven in any suitable manner as by a belt 16, conveying power from any suitable source to a horizontally disposed shaft 17 connected by a sprocket chain 18, shaft 19, and sprocket chain 19' to the shaft 12, the chains 10 and 11 being driven at any desired rate of speed, and the upper run thereof traveling from left to right, viewing Figs. 1, 2 and 3.

Within or over each compartment 2, 3 and 4 of the tank or vat, there is, in the present type of the invention arranged a transverse pipe 20, 21 and 22, respectively, each connected with one of the circulating systems whereby water may be forced by the respective pumps through such pipes and discharged therefrom in any suitable manner against the cans or receptacles to be washed. Herein are indicated for the purpose, longitudinally disposed extensions 23, 24 and 25, leading from the inlet pipes 20, 21 and 22 respectively and disposed beneath and axially in line with the path or travel of the chains 10 and 11 and between the same, said longitudinal extensions having a series of perforations 23', 24' and 25', whereby the water or other cleansing medium may be jetted upwardly, and, in the present embodiment of the invention, into the interior of the cans or receptacles. While said pipes 20, 21 and 22 may each be provided with extensions permitting the discharge of water in jets or otherwise, against the outer surface of the cans or receptacles, herein the pipe 20 is shown as provided with side extensions 26 and 27, substantially parallel with the longitudinal extension 23 and having uprising therefrom, vertically disposed pipes 28, with jetting orifices 29. The pipe 21 is not herein shown as provided with extensions permitting the discharge of water therefrom against the outer surface of the cans or other receptacles, but it is apparent that such extension may be provided within the scope of the invention. The pipe 22 is shown as provided with extensions 30 and 31, having upright portions 32, upon opposite sides and jetting orifices 33. Preferably in the practice of the invention the cans or receptacles are subjected to a steam or other sterilizing bath and this is preferably done as the final step in the cleansing operation. For this purpose, there is in the present instance provided a steam inlet pipe 34 having jetting orifices 35, by which steam may be discharged if desired, directly against the receptacle.

Preferably a housing 36 is provided to inclose the receptacles while they are subjected to the action of the cleansing media, and shown as mounted upon the tank or vat 2, and having end openings 37 and 38 for the entrance and discharge of the receptacles. Preferably near the discharge end thereof the housing is provided with a steam hood 39, having an outlet 40, whereby if desired, the steam may be discharged into the outer air through a window or the like, in the building wherein the apparatus is located.

In the operation of the apparatus shown in Figs. 1 to 5, inclusive, the cans are placed upon the chains 10 and 11 at the left hand end of the apparatus viewing Figs. 1 to 3 inclusive, such chains if a plurality thereof be employed, being relatively positioned to support the cans traveling thereon, mouth downward, it being unnecessary in this type of the invention, to provide means for locking or securing said cans to or upon the chains or conveyer.

Milk is usually received at dairies in cans and there bottled for distribution to customers. In emptying the cans during the bottling operation usually a small amount of milk is left in each can, through neglect or haste of the operative, and this aggregates a considerable amount in the course of a day. I contemplate saving such milk and, may provide any suitable device as a trough 41, of suitable length located beneath the receiving end of the upper run of the chains 9 and 10, and terminating in a contracted end or pipe 42 which discharges into a can or other receptacle, 43, the milk dripping from the cans.

If desired, lateral guiding rails, 44 and 45, may be disposed on the receiving end of the upper run of the chains 10 and 11, the rail 44 being shown as extended beyond the opposing rail to permit the ready positioning of the cans against the latter, which may have a hinged portion 46, that may be turned back when the cans of a larger size are employed, to afford sufficient space therefor. If desired, guiding rails 47 and 48 may be provided at the discharge end of the apparatus.

It is apparent that the endless conveyer herein typified by chains 10 and 11 need not extend beyond the ends of the vat or tank 2.

Milk cans that have been used to ship sweet milk need not be subjected to the cleansing action of an alkali bath, and, therefore, in washing said cans, the pump connected with the pipe 20 may be thrown out of operation, the cans being subjected to the cleansing action of cold water from the pipe 21 and the extensions thereof located over the receptacle 3, the water after its discharge from said pipe flowing into said receptacle and thence to the respective pump to be again forced thereby against succeeding cans.

It is apparent that each of the inlet pipes 20, 21 and 22 may be provided with extensions for the discharge of the cleansing medium into the interior of the can or other receptacle, and also upon the outer surface, if desired, or that one surface only of the can may be cleansed thereby.

While the jet orifices in the longitudinal extensions 23, 24 and 25 may be spaced as desired, preferably they are so spaced that each can in substantially any position over each of said pipes, may receive therein the direct discharge of the cleansing medium, it thus being unnecessary to center the can or receptacle in order that it may receive therein the said discharge. Similarly, the upstanding pipes 29 and 32 may be and preferably are so spaced that the cleansing fluid discharged therefrom is always directed against some portion of the exterior of the can or receptacle as the same passes thereby. Thus the can or receptacle in its travel is subjected to the action of the cleansing fluid at the forward or leading portion of its outer surface, and successively all parts thereof are similarly acted upon. It is apparent that should the cans or receptacles be in such condition as to render necessary an unusual amount of washing the endless conveyer or chains 10 and 11 may temporarily be stopped or the speed thereof slowed down.

Cans containing sweet milk are preferably first subjected to the cleansing action of cold water, then to the action of hot water, and finally to the sterilizing action of steam or the like. In the case of cans that contain milk that has become sour and in the case of certain other receptacles, it becomes desirable to subject them to the action of an alkali or other suitable bath, and for that purpose I may employ the pipe 20, so that such cans or receptacles are successively subjected to the treatment of an alkali bath, cold or hot water, as desired, then a further application of hot water and then steam, and are finally discharged through the apparatus in a thoroughly cleansed and sterilized condition.

Inasmuch as it is necessary merely to place the receptacles upon the endless conveyer in no stated position thereon, but merely preferably closely against the preceding receptacle, it is possible to operate the apparatus at a high rate of speed yet thoroughly to cleanse the receptacles subjected to the action thereof.

Referring to Figs. 6, 7 and 8, I have therein indicated modified forms of receptacle carriers. In Figs. 6 and 7 is shown a board or support 49, adapted to rest preferably by its weight along and longitudinally upon the endless conveyer, and provided with means for positioning thereon the receptacles to be cleansed. In the present instance I have represented the same as provided with openings or sockets 50, wherein the necks of the cans may be received as indicated in Fig. 7. Said board or support may be provided with handles 51, as at opposite ends thereof, so that when the board arrives at the discharge end of the upper run of the endless conveyer, it may be grasped by the operative and the cans thus removed en masse.

In Fig. 7ª I have shown a form of open rack 54 wherein preferably a plurality of cans 55 may be positioned, such rack comprising suitable longitudinal and transverse bars or members united into preferably a rectangular receptacle wherein the cans or other receptacles may rest, being supported therein, if desired by their neck portions as indicated. The open form of rack permits the application of the cleansing medium to the surface of the cans. The said longitudinal bars are represented at 56 and are connected by vertical bars 57.

In Fig. 8 is typified a form of endless conveyer wherein a can or receptacle receiving socket 52 is provided, herein shown as consisting of a horizontally disposed can encircling member and preferably downwardly extending spring members 53, to contact with the lower portion of a receptacle placed therein, as, for example, the neck of a milk can.

In each form of apparatus herein disclosed in accordance with the present type of the invention, it is apparent that the cleansing action and particularly of each cleansing medium, is or may be continuous, in that it is unnecessary to bring the can or receptacle or cover into a predetermined position before the same may be cleansed, but that after entering the range of the first jet until the receptacle passes beyond the range of that cleansing medium, it is continuously subjected to the cleansing action thereof. It is of course apparent that the pipes for the next cleansing medium may be so arranged relatively to those of the first as that the can or receptacle passes without intermission from the action of the first medium to that of the second, and so on, so that the cleansing operation is in all respects continuous.

It will be apparent that a circulating system need not be employed but that the water or other cleansing fluid may be allowed to run to waste if desired. The vat, if employed, may be located at any desired point in operative relation to the cans or receptacles.

Having thus described the invention, I desire it to be understood that although specific descriptive terms are employed, they are used in a generic sense and not for purposes of limitation and that the scope of the invention is set forth in the following claims.

Claims.

1. A receptacle washing apparatus comprising a vat, a circulating system connected thereto and having a substantially horizontally and longitudinally disposed pipe having upwardly directed discharge openings and opposed upright pipes having facing lateral discharge openings, an endless carrier having a substantially horizontal run thereof disposed above said vat over said first mentioned pipe and between said upright pipes and adapted to receive thereon receptacles to be cleansed, and an adjustable lateral guide for receptacles so positioned upon said carrier.

2. A receptacle washing apparatus comprising a vat, an endless carrier having an operative run supported above the same and adapted to receive receptacles supported mouth downward thereon, cleansing medium pipes within said vat and directed toward the interior of said receptacles, and means located anterior to said cleansing pipes to receive material discharged from said receptacles, said material being received by said means uncontaminated by said cleansing medium.

3. A receptacle washing apparatus comprising a vat, an endless carrier having operative run supported above the same and adapted to receive receptacles supported mouth downward thereon, cleansing medium pipes within said vat and directed toward the interior and the exterior of said receptacles, and means located anterior to said cleansing pipes to receive material discharged from said receptacles, said material being received by said means uncontaminated by said cleansing medium.

4. A receptacle washing apparatus comprising a vat having compartments therein, a cleansing fluid circulating system connected to each compartment and terminating in discharge pipes upwardly directed, an endless carrier comprising laterally spaced portions whereon receptacles may be positioned mouth downward and spanning the same, and a trough beneath the upper run of said endless carrier anterior to said discharge pipes to receive material draining from said receptacles.

5. A receptacle washing apparatus comprising a vat having a plurality of compartments, means permitting the heating of one or more of said compartments, a circulating system connected to each compartment, each system terminating in discharge pipes arranged longitudinally of said compartments and having upwardly directed openings to discharge a cleansing medium into the mouth of the receptacles, and one or more of said systems having upright pipes provided with lateral openings to discharge a cleansing medium against the sides of the receptacles and an endless carrier having an operative run positioned above said discharge pipes and adapted to receive receptacles positioned thereon mouth downward.

6. A receptacle washing apparatus comprising a vat having a plurality of compartments, a circulating system connected to each compartment, each system terminating in discharge pipes arranged longitudinally of said compartments and having upwardly directed openings to discharge a cleansing medium into the mouth of the receptacles, and one or more of said systems having upright pipes provided with lateral openings to discharge a cleansing medium against the sides of the receptacles and an endless carrier having an operative run positioned above said discharge pipes and adapted to receive receptacles positioned thereon mouth downward whereby the interior of said receptacles may be cleansed from said upwardly directed openings and the exterior from said lateral discharge openings.

7. A receptacle washing apparatus comprising a vat, a circulating system connected thereto and having a pipe having upwardly directed discharge openings and opposed upright pipes having facing lateral discharge openings, and an endless carrier having a substantially horizontal run thereof disposed above said vat over said first mentioned pipe and between said upright pipes and adapted to receive thereon receptacles to be cleansed, whereby the interior of said receptacles may be cleansed from said upwardly directed openings and the exterior from said lateral discharge openings.

8. A receptacle washing apparatus comprising a vat having a circulating system including a pump, a substantially horizontal discharge pipe having upwardly directed openings and upright opposed discharge pipes having lateral facing discharge openings, and an endless carrier comprising a plurality of laterally spaced members upon which receptacles to be cleansed may be supported to span the same, and means to operate said carrier.

9. A receptacle washing apparatus comprising a vat having a circulating system including a pump, a horizontal discharge pipe having upwardly directed openings and upright opposed discharge pipes having lateral facing discharge openings, an endless carrier comprising a plurality of laterally spaced members upon which receptacles to be cleansed may be supported to span the same, means to operate said carrier, and a trough anterior to said discharge pipes to receive material draining from said receptacles said material being received by said means uncontaminated by the cleansing medium.

10. A receptacle washing apparatus comprising a vat having a plurality of compartments, a circulating system connected to each vat, means to heat the contents of one or more of said vats, discharge pipes connected to said systems having upwardly directed discharge openings, opposed upright discharge pipes having lateral facing discharge openings, an endless carrier comprising laterally spaced members adapted to receive thereon receptacles to be cleansed, said endless carrier having an upper horizontal run projecting beyond said vat at the intake end thereof, and a receptacle beneath said projecting portion of said run of said carrier to receive material draining from receptacles positioned thereon.

11. A receptacle washing apparatus comprising a vat having a plurality of compartments, a circulating system connected to each vat, means to heat the contents of one or more of said vats, discharge pipes connected to said systems having upwardly directed discharge openings, opposed right discharge pipes having lateral facing discharge openings, an endless carrier comprising laterally spaced members adapted to receive thereon receptacles to be cleansed, said endless carrier having an upper horizontal run projecting beyond said vat at the intake end thereof, a receptacle beneath said projecting portion of said run of said carrier to receive material draining from receptacles positioned thereon, and a housing mounted upon said vat through which the receptacles are traversed upon said carrier.

12. A receptacle washing apparatus comprising a vat having a plurality of compartments, a circulating system connected to each vat, means to heat the contents of one or more of said vats, discharge pipes connected to said systems having upwardly directed discharge openings, opposed upright discharge pipes having lateral facing discharge openings, an endless carrier comprising laterally spaced members adapted to receive thereon receptacles to be cleansed, said endless carrier having an upper horizontal run projecting beyond said vat at the intake end thereof, a receptacle beneath said projecting portion of said run of said carrier to receive material draining from receptacles positioned thereon, a housing mounted upon said vat through which the receptacles are traversed upon said carrier, and lateral guides for the receptacles supported upon said projecting portion of said carrier.

13. A receptacle washing apparatus comprising a support, a carrier adapted to receive receptacles thereon, cleansing medium pipes having discharge orifices directed toward said receptacles positioned thereon, and means adapted to receive from the receptacles, when positioned upon the carrier and in a condition uncontaminated by the cleansing medium, the material contained in said receptacles when in use, and discharged therefrom when said receptacles are positioned upon said carrier.

In testimony whereof, I have signed my name to this specification, in the presence of two subscribing witnesses.

JAMES R. BLAIR.

Witnesses:
  IRVING U. TOWNSEND,
  ANNIE U. CHESLEY.